United States Patent [19]

Carpentier

[11] 4,307,747

[45] Dec. 29, 1981

[54] DUST TRAP WITH REMOVABLE VALVE SEAT

[76] Inventor: Urgel R. Carpentier, 3 Bailey Ave., Plattsburgh, N.Y. 12901

[21] Appl. No.: 112,333

[22] Filed: Jan. 15, 1980

[51] Int. Cl.³ ............................................. F16K 43/00
[52] U.S. Cl. .................................... 137/315; 251/360
[58] Field of Search .................. 137/315, 329, 329.01, 137/329.02, 329.03, 329.04, 454.2, 454.5, 454.6; 251/58, 62, 228, 298, 360; 222/540

[56] References Cited

U.S. PATENT DOCUMENTS

| | | | |
|---|---|---|---|
| 953,940 | 4/1910 | Beam | 137/329.02 |
| 1,039,059 | 9/1912 | Howard et al. | 137/454.6 |
| 1,602,372 | 10/1926 | Bullen | 137/329 |
| 3,257,045 | 6/1966 | Carpentier | 222/450 |
| 3,410,422 | 11/1968 | Carpentier | 251/62 |
| 4,190,074 | 2/1980 | Mailliet et al. | 137/315 |

Primary Examiner—Martin P. Schwadron
Assistant Examiner—G. L. Walton
Attorney, Agent, or Firm—James W. Fitzsimmons; Warren N. Low

[57] ABSTRACT

A dust trap for bag houses and the like which is provided with an internal removable valve seat to facilitate replacement of the valve seat or regrinding of the valve surface. The valve seat and dust trap have complimentary supporting parts to support the valve seat while it is being removed from or replaced in the dust trap.

1 Claim, 4 Drawing Figures

DUST TRAP WITH REMOVABLE VALVE SEAT

BACKGROUND OF THE INVENTION

The present invention relates to a dust trap and a valve for controlling a flow through a dust trap, and, more particularly to an improved technique for mounting a valve seat in a dust trap to permit and assist in its easy removal and replacement.

In my previously issued U.S. Pat. No. 3,257,045, entitled, "DUST TRAP AND VALVE THEREFOR", patented June 21, 1966, I've given a complete description of the physical structure and the operation of dust traps including their valves, showing particularly their function in bag houses and other cleaning machines and services. But, basically, a dust trap comprises a housing, a valve seat and a valve flap, with some means for moving a valve flap into and out of engagement with a valve seat. These are mounted in enclosed systems where there is a high degree of vacuum, across the valve flap.

The inter-relationship of the valve seat and the valve flap is as critical as the relationship of a valve and a valve seat in an internal combustion engine. Specifically, the valve flap must seat perfectly against the valve seat to provide optimal operation of the valve in the dust trap.

As a matter of fact, the inter-relationship of the valve seat and the flap is so critical that the valve seat must be removed and polished and ground at intervals in order to maintain optimum pressure contact relationship between the two parts.

The specific nature of the problem in removing the valve seat and grinding its surface is that it is heavy and cumbersome, and frequently is so mounted and cast into the dust trap itself that the whole dust system must be taken apart in order to regrind the surface of the valve seat. Obviously, this creates many problems in that a shut-down of a system means a loss of production of the system.

It is the first object of this invention to provide an improved valve seat and valve seat mounting means which accommodates the simple removal of the valve seat itself, without taking apart the entire dust trap system.

It is the further object of this invention to provide a replaceable valve seat in a system, whereby the replacement of the valve seat itself can take place within a very few minutes, without tying up the operation of the vacuum system.

A further object of this invention is to provide an improved supporting means for the removable valve seat whereby the valve seat can be removed from or inserted into the dust trap with simplicity.

DESCRIPTION OF THE DRAWINGS

These and other objects and advantages of this invention will become apparent to those skilled in the art, and can be better understood from the following specifications and drawings, wherein:

FIG. 3 is a top elevation of the mounting flange of the valve seat while,

DETAILED DESCRIPTION OF THE INVENTION

Figure 1:
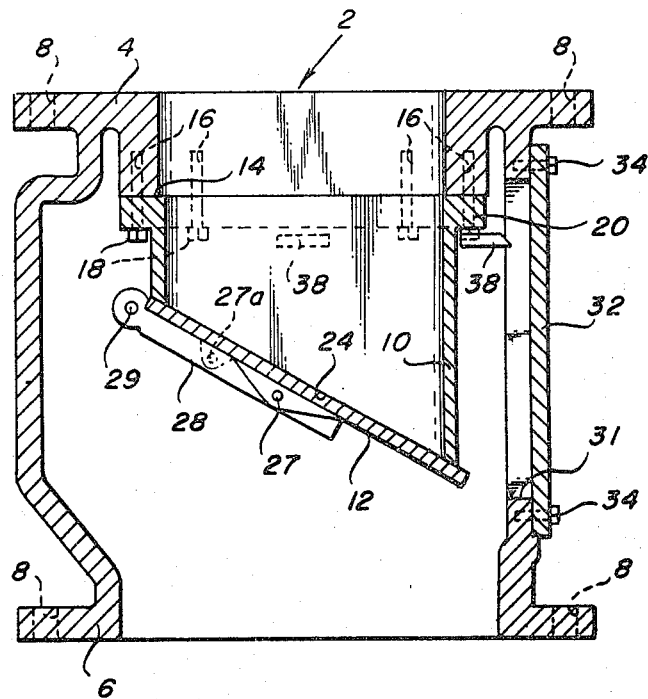
FIG. 1 is a side elevation partly in section, showing the physical location of a valve seat and flap in a dust trap.

Referring now to FIG. 1, a dust trap 2, is shown having a pair of parallel mounting surfaces 4 and 6, including bolt holes 8, for securing the same in a system. The dust trap has an axial passageway or flow path therethrough shown in a vertical position in FIG. 1, whereby a flow can be had from the top mounting surface 4, through the bottom mounting surface 6. In FIG. 1, however, a valve seat 10, and a valve flap 12, are shown closing the flow path through the dust trap.

Actually, the dust trap is provided with a valve seat-receiving flange surface 14, which defines a number of bolt holes 16, for accommodating screws 18, to secure the upper surface 19, of flange 20 of the valve seat 10, against the flange surface 14.

The valve seat 10, at its opposite end, is provided with flag-engaging surface 24, which lies periferally about the seat and defines a central opening therethrough. The valve flap 12, closes against the flap-engaging surface 24, to seal the flow through the dust trap.

The valve flap 12, is mounted on an arm 28, for pivotal movement into and out of engagement with the flap-engaging surface 24. It should be noticed that the arm 28, and its supporting mechanism, is apart from the valve seat 10, to permit the removal of the valve seat 10, when the valve flap 12, is in the open position—i.e., not exerting any pressure on the flap-engaging surface 24.

It must be remembered that the valve seat 10, and the valve flap 12, are rigid members that are supported for forced-engagement, in that they have to be held close together in a vacuum type arrangement to prevent any kind of flow through the dust trap. It should be understood, therefor, that the flap 12, is forced against the flap-engaging surface 24, by the arm 28, which is connected by wrist pin 27, to flap 12. The arm 28, in turn, is connected by shaft 29, to be responsive to the movement of a hydraulic cylinder 30 in the example shown, but obviously any other crank means for applying pressure on the flap 12, against the flap-engaging surface 24, would suffice to make this instrument function properly.

My earlier U.S. Pat. No. 3,257,054, describes the function of the inter-relationship between the flap and the flap-engaging surface. My particular invention at this stage is directed to the function of removing the valve seat 10, in a simple manner so that its flap-engaging surface 24, may be reground for perfect contact with the valve flap 12.

In order to accomplish this objective, the dust trap is provided with a cover 32, that is bolted with screws 34, to one face of the dust trap. The dimension of the cover is such that when removed an opening 31, is exposed which is large enough for the valve seat to be slid laterally through the opening 31, and out of and away from the dust trap.

Figure 2:
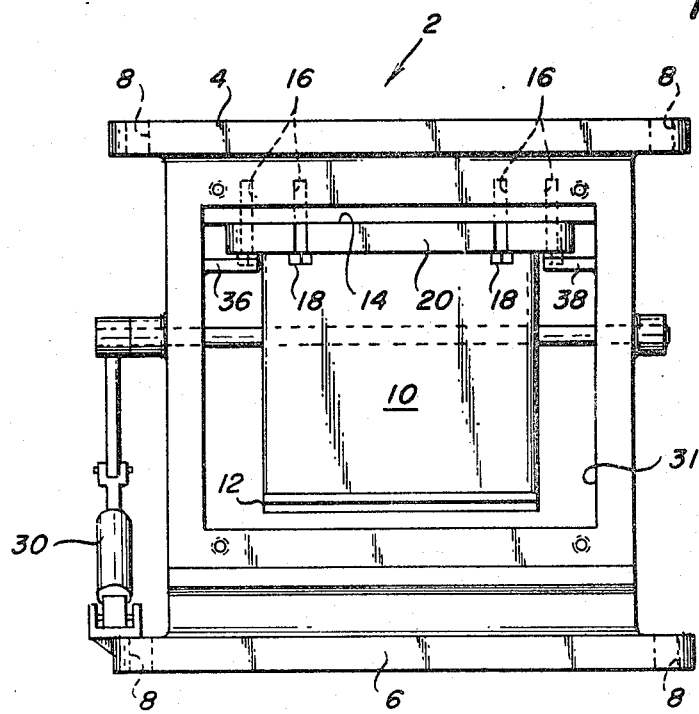
FIG. 2 is an end view of the dust trap exposing the valve seat located within the dust trap.

One of the significant parts of my invention as shown in FIG. 2, is that I provide a set of parallel supporting ledges 36, 38, on opposite sides of the dust trap and on walls transverse to the wall containing opening 31, to support the corresponding ledge surface of flanges, 20, of the valve seat. Specifically, when the screws 18, are removed from the bolt holes 16, the valve seat drops down so that its ledge surface rests on the parallel supporting ledges 36, 38. Now the entire valve seat can be slid laterally along the supporting ledges 36, 38, and out the opening 31, which is covered, normally, by the cover 32.

It must be understood that the valve seat is a heavy article, and the support ledges 36, 38, will hold it while it is being slid out the cover hole, whereupon a person or an instrument can be used to grab the valve seat and remove it the rest of the way from the dust trap.

Once the valve seat 10, is physically removed from the valve trap, it can be taken to a machine shop and its flap-engaging surface 24, can be reground and resurfaced for perfect contact with the flap.

An important element of this invention, however, is that a replacement valve seat could be immediately reinserted into the dust trap upon the removal of the first one, thereby keeping the system in operation for longer periods of time without requiring shutting it down to resurface the valve seat.

The reinsertion or replacement of the valve seat would be as follows: the ledge surface of flange 20, of the valve seat would be positioned on the supporting ledges 36, 38, and then slid into operating position whereupon the screws 18, would be passed through the flange 20, to bolt its flange surface into the flange surface 14, of the dust trap. Only a matter of minutes is required to slide this valve seat into position for bolting into the dust trap.

Figure 3:
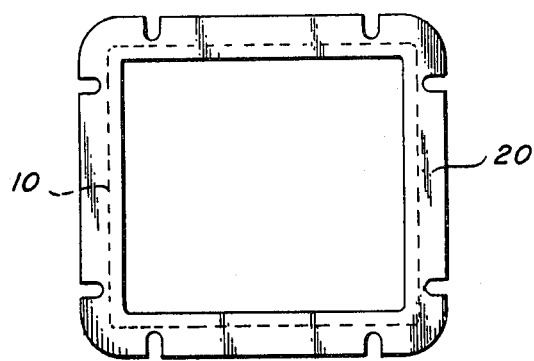
Figure 4:
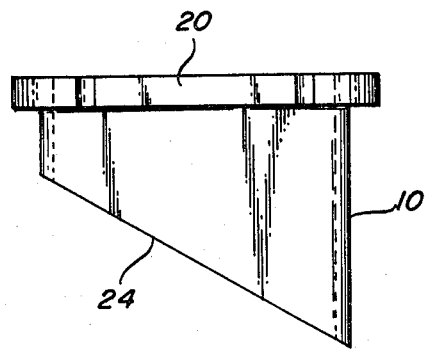
FIG. 4 is a side elevation, partly in section, of the flange and valve seat combination.

It must be recognized that in view of the weight of the valve seat, it is a very significant improvement to provide the ledge support 36, 38, for the valve seat while it is being slid into position to be bolted into place. Otherwise it would be almost an impossible task for the operator to bolt the valve seat into position. Note, too, that bolt holes are shown in FIG. 3 in all surfaces of the flange 20, to facilitate raising and lowering of the valve seat without interference from the ledges 36, 38.

OPERATION

While the operation of my invention is more particularly described in my previously issued U.S. Pat. No. 3,257,054, it can be understood from the drawings that once the valve seat 10, is bolted against the flange surface 14, of the dust trap, then in response to pressure on the arm 28, the flap 12, will be closed against the valve seat 10, and the system will be closed to provide a high vacuum closure.

At a time when its decided to dump the contents of the dust trap, the arm 28, is pivoted to pull the dust flap 12, away from the valve seat 10, whereupon the contents in the dust trap are dumped through the valve seat. The arm 28, is then moved in the opposite direction to urge the flap 12, back into contact with the flap-engaging surface 24, to re-seal the unit for further vacuum use.

As a second element of my invention, I have discovered that a significant lessening of the force required to remove the flap 12, from the valve seat 10, can be accomplished by shortening the arm 28, and connecting it off-center, as shown in the dotted lines of FIG. 1 (27a) to the flap 12. In this embodiment, the edge of the flap 12, away from the pivot point 29 of arm 28, acts as a fulcrum and the edge of the flap near the pivot point 29, is lifted away from the valve seat 10, first to break the vacuum before the entire flap 12, is removed from the valve seat 10. Accordingly, the force required to remove the flap from the valve seat is greatly reduced.

It is obvious that the present embodiment of the invention is to be considered as only illustrative and not restricted since the invention may be embodied in other specific forms without departing from the spirit or essential characteristics of it.

Accordingly, what is claimed and desired to be secured by United States Letters Patent, is:

1. In a dust trap which defines a flow path axially therethrough, a device positioned within said dust trap and in said flow path for controlling the flow therethrough, comprising:

a valve seat defining a central opening, means removably securing said valve seat in said dust trap comprising a pair of matching flange surfaces, one on said dust trap and one on said valve seat, with bolts securing said surfaces together, a matching valve flap for covering said valve seat opening, means independent of said valve seat supporting said valve flap for movement into and out of sealing engagement with said valve seat;

said dust trap having a number of sides at least two of which are opposite and parallel, providing a polygonal cross section to define said axial flow path;

said valve seat having a number of sides equal to and complementary to those of said valve body to provide a corresponding cross section;

one of said dust trap sides transverse to said parallel sides defining a port including a removable port cover of a size to permit said valve seat to be slid laterally from said valve body through said port when unbolted; and, said dust trap and said valve seat flange surfaces having complementary matching ledges to support said valve seat in a predetermined location, while permitting supported lateral movement of said valve seat outwardly from said trap through said port, whereby said valve seat may be removed from or replaced in said dust trap, and permitting said valve seat to be guided laterally along the axis of said flanges; and, said valve seat ledge is axially displaced from said dust trap ledge by a distance greater than the thickness of the valve seat flange to permit the valve seat to be lowered onto and raised above said dust trap ledge during insertion and removal.

* * * * *